United States Patent [19]

Smith, II

[11] Patent Number: 5,685,681

[45] Date of Patent: Nov. 11, 1997

[54] LUBRICATED SPINDLE AND NUT SYSTEM WITH IMPROVED NUT RETENTION

[75] Inventor: Elwood Beckman Smith, II, Shawnee, Okla.

[73] Assignee: Al-Ko Kober Corporation, Shawnee, Okla.

[21] Appl. No.: 544,766

[22] Filed: Oct. 18, 1995

Related U.S. Application Data

[63] Continuation-in-part of Ser. No. 383,780, Feb. 6, 1995, Pat. No. 5,611,653.

[51] Int. Cl.⁶ .................................................. F16B 35/00
[52] U.S. Cl. .................................. 411/395; 411/294
[58] Field of Search ........................ 411/204–212, 315–317, 411/395, 411, 424, 513, 940, 944, 945, 428, 534; 384/391; 74/607

[56] References Cited

U.S. PATENT DOCUMENTS

| | | | |
|---|---|---|---|
| 444,053 | 1/1891 | House | 411/945 |
| 710,795 | 10/1902 | Moser | 411/316 |
| 1,241,401 | 9/1917 | Kusy | 411/315 |
| 1,593,969 | 7/1926 | Fox | 384/391 |
| 1,795,760 | 3/1931 | Carney | 384/391 |
| 2,126,452 | 8/1938 | Creveling | 411/428 |
| 2,395,234 | 2/1946 | Schlueter | 411/294 |
| 5,120,170 | 6/1992 | Kalies | 411/213 |
| 5,372,434 | 12/1994 | Roberts | 384/391 |

*Primary Examiner*—Steven N. Meyers
*Assistant Examiner*—Gary Estremsky
*Attorney, Agent, or Firm*—Head, Johnson & Kachigian

[57] ABSTRACT

The system includes a spindle having a threaded end and a lubricated area spaced from the threaded end, the spindle having a longitudinal axial lubricant passageway extending from the spindle end and terminating adjacent the lubricated area. A lateral lubricant passageway communicates the longitudinal lubricant passageway with the lubricated area. The spindle has radially, diametrically opposed key recesses adjacent the spindle outer end, the key recesses being spaced away from the spindle longitudinal lubricant passageway. A C-shaped flexible retainer has coaxial end portions that are spread apart to extend through openings or slots in a nut and then into the key recesses to lock the nut in threaded position on the spindle. Since the key recesses do not communicate with the longitudinal lubricant passageway, they do not interfere with lubrication of the spindle.

1 Claim, 4 Drawing Sheets

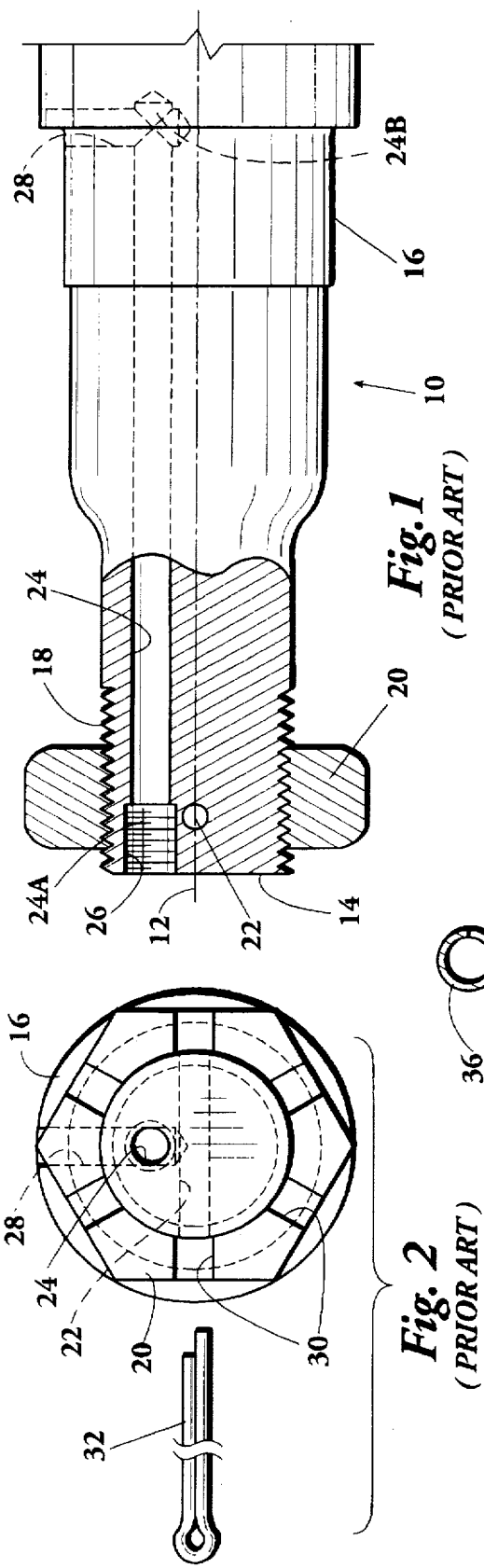
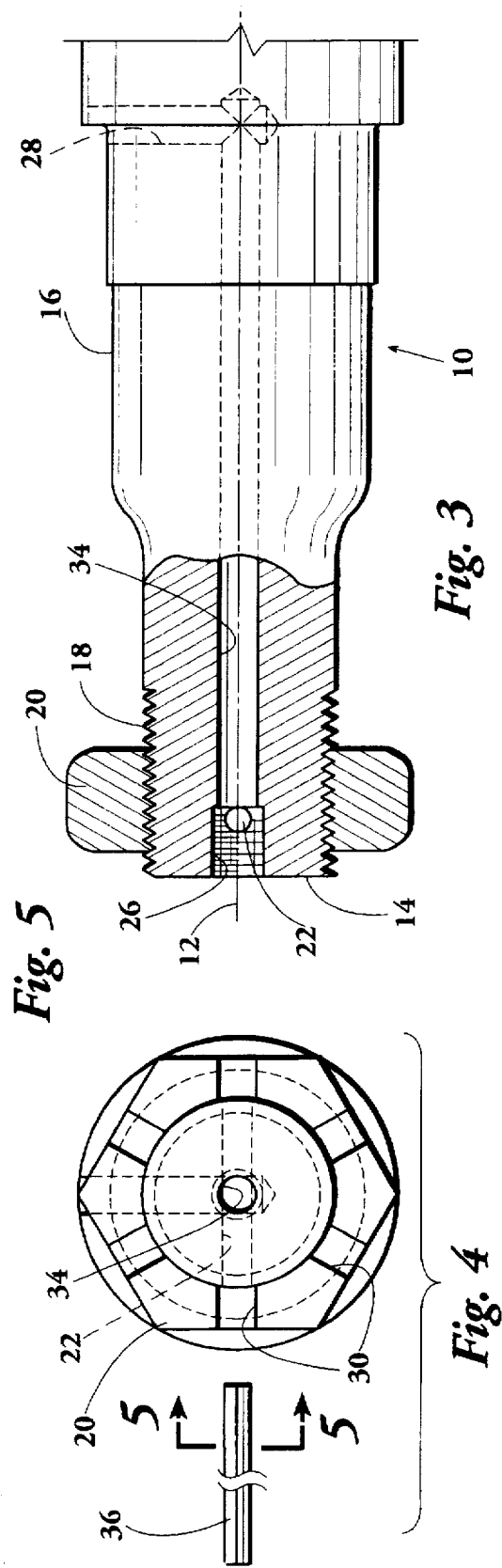

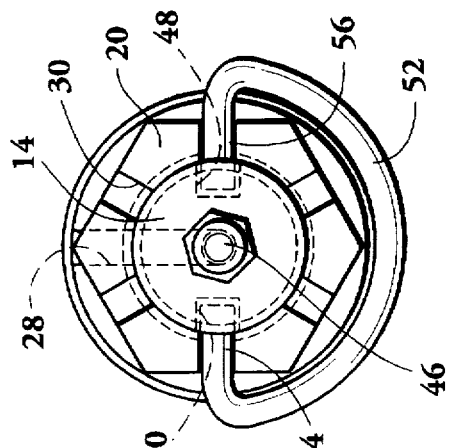
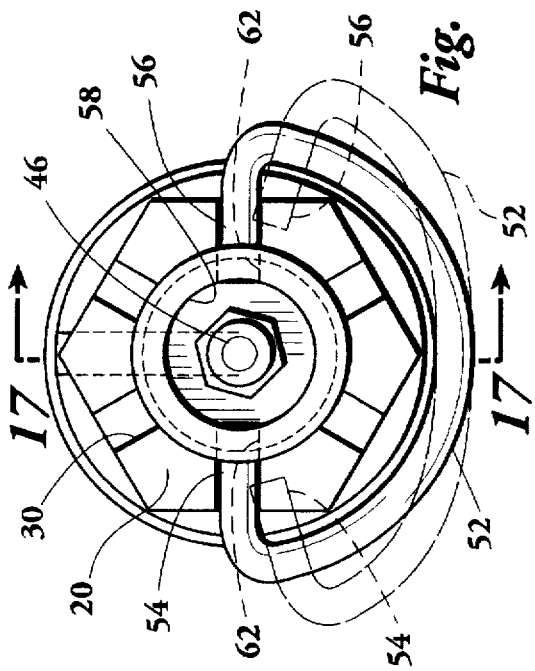
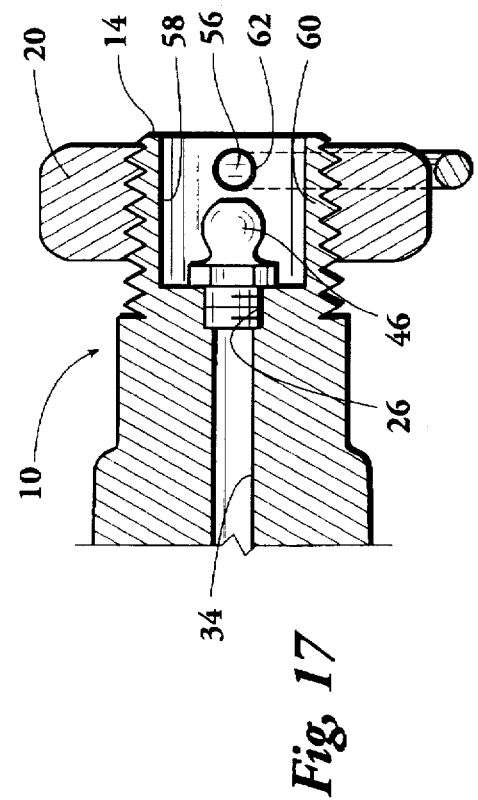
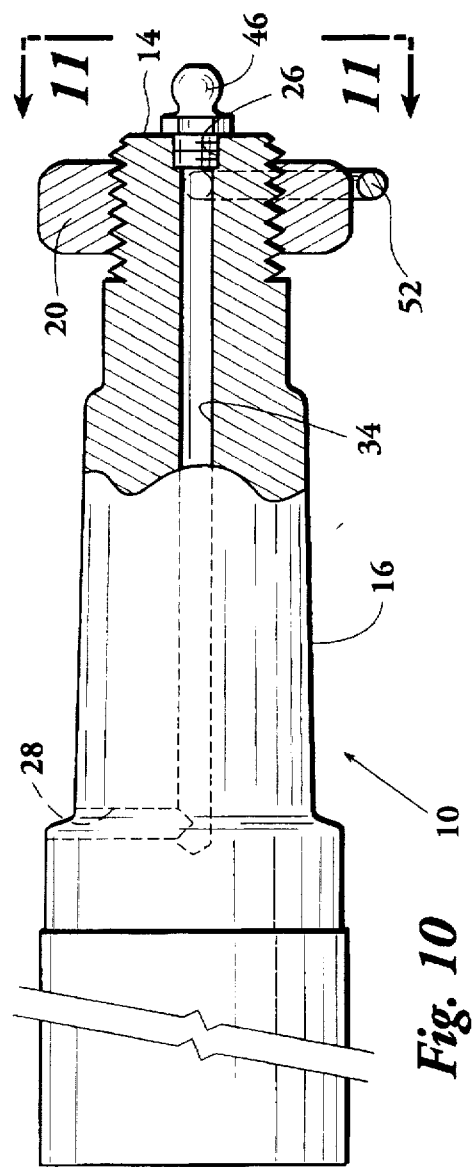

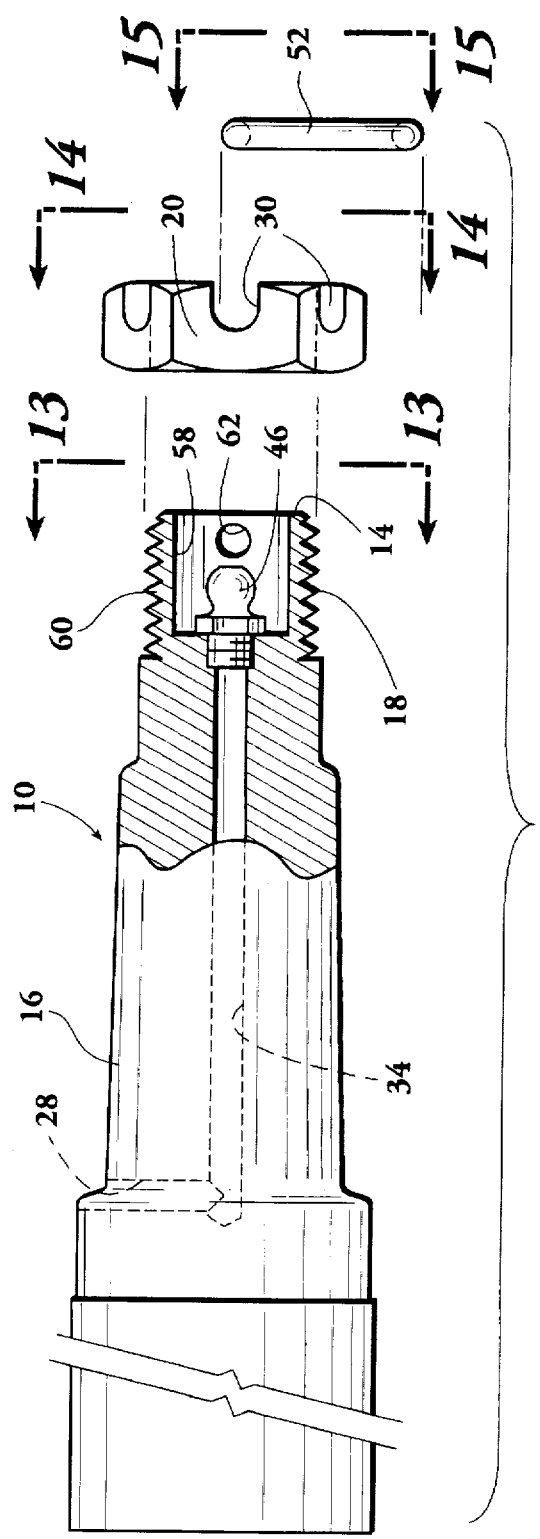
Fig. 12
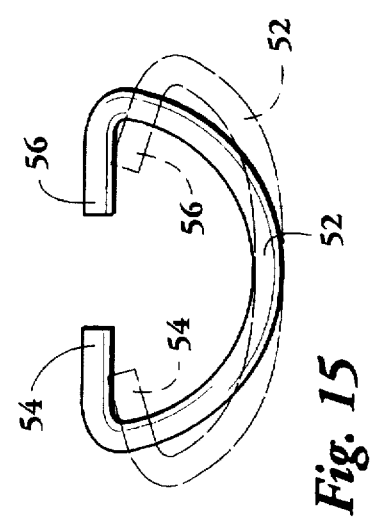
Fig. 15
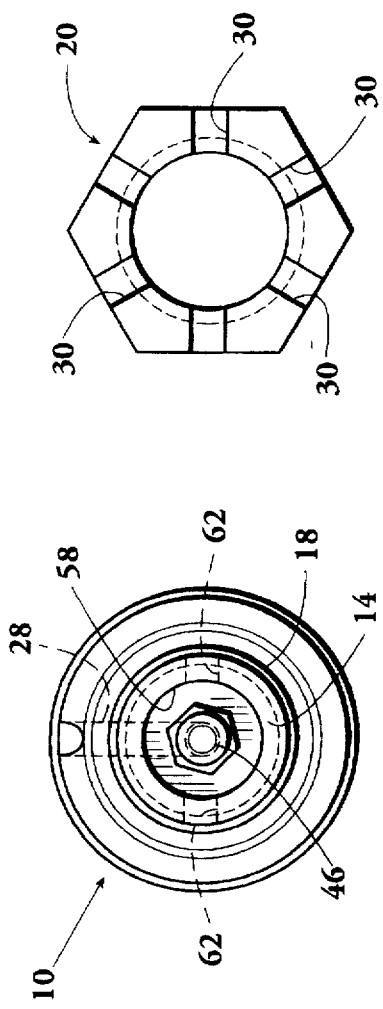
Fig. 14
Fig. 13

LUBRICATED SPINDLE AND NUT SYSTEM WITH IMPROVED NUT RETENTION

REFERENCE TO PENDING APPLICATIONS

This is a continuation-in-part of patent application Ser. No. 08/383,780 filed 6 Feb. 1995 now U.S. Pat No. 5,611,653 entitled "Spindle Having Lubrication and Nut Retention Means".

BACKGROUND OF THE INVENTION

Many machinery applications require lubrication to a bearing or bearing surface that is positioned on a spindle. One way to achieve this objective is to provide a lubricant passageway that is coincident with the spindle axis. By means of a grease zert or other grease receiving element that can be threaded or pressed into the end of the spindle, grease can be injected through the lubricant passageway, the lubricant traveling through the passageway until it encounters a second lubricant passageway which communicates, at one end, with the first lubricant passageway and, at that other end, with a lubricated area on the spindle. This system works well except it introduces a problem, that is, the problem of keying a nut threaded onto the spindle at the outer end. That is, it is very common to employ a pin or cotter key to extend through the spindle in the threaded area so that a nut positioned on the spindle can be held in position. The problem then arises as to the interference between the first lubricant passageway and the key opening. Since these openings intersect, grease injected into the passageway can pass out of the key opening. In addition, a key, when inserted in the key opening, interferes with the passage of grease along the first lubricant passageway.

One way to overcome this problem is illustrated in U.S. Pat No. 5,120,170 entitled "Apparatus For Retaining A Nut On A Spindle". In this patent the first lubricant passageway is coaxial with the spindle axis. However, to avoid the intersection of the key opening with the lubricant passageway, the key opening is offset from the center of the spindle. That is, the key opening is drilled along a chord midway between the lubricant passageway and the peripheral exterior of the spindle threaded portion. A pin, such as a cotter key, can then be inserted in the key opening to pass through openings or slots in a nut to lock the nut onto the spindle.

A problem with the system of U.S. Pat. No. 5,120,170 is that the placement of the key opening on a chord of the spindle makes it difficult to align a pin with openings or slots in a nut. In U.S. Pat. No. 5,120,170 the nut illustrated is termed a "castellated nut", that is, a nut that has several circumferentially spaced slots. A cotter pin extending through a key opening that is a chord of the spindle end requires wide slots in the nut.

Further, it is difficult to drill a cordial hole through a spindle. A special fixture is usually required to prevent the hole being drilled from wandering and to prevent drill bit breakage.

U.S. Pat. No. 5,372,434 that issued on 13 Dec. 1994 entitled "Spindle With Lubrication Channel" provides an improved means of moving lubricant to a bearing that is mounted on a spindle. In the arrangement illustrated in this patent, an internal longitudinal passageway extends from the end of the spindle to intersect a lateral passageway. The longitudinal passageway is offset from the spindle center and is spaced from and paralleled to the axis of the spindle. A lateral opening is provided in the spindle adjacent the end. The lateral opening extends through the spindle axis and is configured to receive a cotter key or the like to retain a nut in position. The lateral key receiving passageway extends through the spindle axial center and is therefore displaced from the longitudinal lubricant passageway. In this way, when grease is inserted in the longitudinal passageway the grease does not communicate with the lateral key passageway.

The system of U.S. Pat. No. 5,372,434 overcomes the basic problem of the prior art but has some limitations. For smaller diameter spindles, it is difficult to provide a longitudinal passageway offset from the center axis that can receive a standard grease zert without interfering with inserting a nut onto the end of the spindle. As stated another way, for spindles of smaller diameters, the longitudinal grease passageway must be spaced relatively close to the outside circumferential edge of the spindle in order that the spindle passageway does not intersect the lateral key passageway extending through the spindle centerline. With the lateral passageway relatively close to the spindle circumferential edge, a standard grease zert cannot be installed in a threaded opening in the longitudinal grease passageway without extending beyond the circumferential edge of the spindle, thus interfering with the bolt.

It is highly desirable that a lubricated spindle grease zert be positioned in the center of the spindle for purposes of symmetry. Further, an axial passageway in a spindle causes minimal decrease in the strength of a spindle compared to the placement of a passageway closer to the spindle external circumferential surface. For this reason, the present disclosure provides improved ways of placing a grease zert in the center of a spindle in a way that does not interfere with the use of a key to retain a nut in position on the spindle.

The term "grease zert" as used herein means a grease fitting such as of the type having an integral head that removably receives attachment of a grease gun, and a central passageway through which grease can be channeled from a grease gun to flow to a bearing or other area that requires lubrication. A commonly employed "grease zert" is illustrated in the drawings as an example of a grease fitting and is of the type of grease fittings that has an internal check valve so that grease having been forced through the fitting is prevented from flowing in the opposite direction.

SUMMARY OF THE INVENTION

This invention provides a spindle having a grease zert for conveying lubrication to a lubricated area and for retaining a nut, in which the grease zert is in the center of the spindle outer end. The spindle has an axis, an outer end and a lubricated area. The lubricated area is concentric with the spindle axis and is spaced away from the spindle outer end. A threaded area is formed on the spindle at the outer end.

In one embodiment of the invention, a first lubricant passageway is concentric with the spindle axis. A key opening passes through the spindle axis. The diameter of the first lubricant passageway is greater than the diameter of the key opening. To retain a nut on the spindle, a key is employed that has a circumferential surface that substantially conforms to the key opening, that is, a key is selected that has a diameter to snugly fit in the key opening so that when lubricant is forced into the first lubricant passageway, the lubricant can flow around the key that is positioned in the key opening but the tight fit of the key in the key opening prevents lubricant from escaping out of the key opening. A key that fulfills this requirement can be formed as a roll pin.

In another embodiment, a tubular nut retainer is positioned in the key opening, the diameter of the tubular nut retainer being selected to snugly fit in the key opening. Lubricant can flow through the first lubricant passageway that is larger in diameter than the key opening and to either side of the tubular sleeve, however, grease cannot escape along the key opening since the tubular sleeve completely fills the key opening. To retain a nut on the spindle a cotter key is inserted through the tubular sleeve to engage holes or slots in the nut to thereby prevent the nut from inadvertently being unthreaded from the spindle.

An additional embodiment employs a different type of nut retainer. In this embodiment, the spindle has a longitudinal lubrication passageway coaxial with the spindle. A grease zert is secured at the outer end of the spindle in communication with the longitudinal passageway. Instead of a lateral key receiving opening through the spindle, this embodiment employs radial recesses formed in the spindle adjacent to and spaced from the end. The radial recesses are on opposed sides of the spindle and in axial alignment, but each of the opposed radial recesses is of a depth less than one-half of the diameter of the spindle. In this way, the radial recesses do not intersect or communicate with the longitudinal lubricant passageway within the spindle. To retain a nut in position on the spindle, a flexible metal retainer is employed. The retainer is of generally C-shaped configuration having opposed ends with portions adjacent each of the ends that extend towards each other. The normal spacing between the ends is less than the spindle diameter. The retainer is deformed from a normal to a deformed condition to permit, when in the deformed condition, the end portions to extend through opposed openings or slots in a nut and into the spindle radial recesses. In this way, the retainer, when in the normal condition, prevents rotation of the nut relative to the spindle.

A final embodiment of the invention employs a spindle having an axial internal longitudinal lubrication passageway and, in addition, has a coaxial recess in the spindle outer end. The lubrication passageway communicates with the coaxial recess and the coaxial recess forms an integral tubular portion at the spindle outer end. A radial passageway extends through the spindle tubular portion. A grease zert is received within the radial recess in communication with the longitudinal lubrication passageway. The radial recess is sufficient depth that the grease zert remains clear of the radial opening through the spindle tubular portion so that a key member, such as a cotter key, can be positioned in the radial opening to retain a nut in position. Instead of a key member, a C-shaped retainer can be employed to retain a nut in position on the spindle.

A better understanding of the invention will be obtained from the following description of the preferred embodiments taken in conjunction with the attached drawings.

DESCRIPTION OF THE DRAWINGS

FIG. 1 is an elevational partial cross-sectional view of a portion of a spindle illustrating prior art. In this arrangement the spindle has a lubricated area and threads at the outer end that receive a nut. The spindle has a passageway for conducting lubrication from the end of the spindle to the lubricated area and for receiving a key, such as a cotter pin, for retaining a nut in position. A longitudinal lubrication passageway is offset from the spindle axis.

FIG. 2 is an end view of the arrangement of FIG. 1 showing a cotter pin as used to retain the nut on the spindle. The key opening that receives the cotter pin and the first lubricant passageway are offset so that lubricant cannot pass from the longitudinal lubrication passageway to the key passageway.

FIG. 3 is an elevational, partial cross-sectional view, of a spindle as shown in FIG. 1 but wherein the longitudinal lubricant passageway is concentric with the spindle axis.

FIG. 4 is an end view of the embodiment of FIG. 3 wherein the key opening intersects the longitudinal lubricant passageway and wherein a key is employed having a diameter to snugly fit in the key opening so that leakage of lubricant out the key opening is prevented.

FIG. 5 is a cross-sectional view of the key as shown in FIG. 4 showing the use of a roll pin as the key to retain a nut in position.

FIG. 10 is an elevational partially cross-sectional view of a spindle showing a coaxial longitudinal lubrication passageway with a grease zert at the spindle outer end and a nut positioned on the spindle.

FIG. 11 is an end view of the spindle and nut of FIG. 10. FIG. 11 shows the use of a C-shaped flexible retainer to retain the nut in position on the spindle.

FIG. 12 is an exploded view of another embodiment of the invention showing a spindle, partially in cross-section, with a nut and a C-shaped retainer. FIG. 12 shows the spindle with a coaxial recess in the outer end that receives a grease zert.

FIG. 13 is an elevational end view of the spindle as taken along the line 13—13 of FIG. 12 showing the coaxial recess and the lateral key openings.

FIG. 14 is an elevational view of the nut as taken along the line 14—14 of FIG. 12.

FIG. 15 is an elevational view of a C-shaped retainer as taken along the line 15—15 of FIG. 12. In this figure, the normal configuration of the retainer is shown in solid outline and the retainer in a deformed condition is shown in dotted outline.

FIG. 16 is an end view of the spindle, nut and C-shaped retainer of FIG. 12 with the nut and C-shaped retainer in position on the spindle.

FIG. 17 is a cross-sectional view as taken along the line 17—17 of FIG. 16 showing the nut received on the spindle, the nut being threadably retained by a C-shaped key member.

DETAILED DESCRIPTION OF THE PREFERRED EMBODIMENTS

Figure 6:
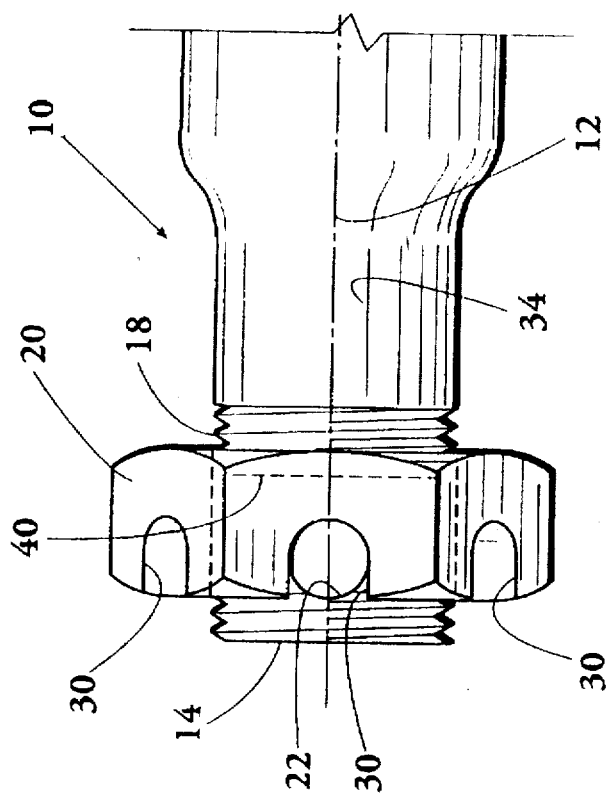
FIG. 6 is an elevational view of the end portion of a spindle illustrating a different embodiment of the invention.

Referring to FIGS. 1 and 2, a prior art embodiment of a spindle having a lubrication passageway and nut retention is shown. This embodiment is illustrated and described in detail in U.S. Pat. No. 5,372,434. A spindle is generally indicated by numeral 10, a spindle having an axis 12. The spindle has an outer end 14 and, spaced from the outer end 14, a lubricated area 16. By "lubricated area" means an area wherein lubrication is required. Lubricated area 16 may be in the form of a cylindrical surface on which a rotational object, such as a wheel or gear, is received or the lubricated area 16 may be an area that receives a bearing (not shown) that receives lubrication.

Spindle 10 further has a threaded area 18 at the outer end 14. A nut 20 is received on threaded area 18 to hold an object, such as a wheel, gear or so forth on the spindle.

In order to retain nut 20 in position on the spindle, that is, to prevent the nut from unintentionally unthreading, it is a common practice to use a key, such as a cotter pin. For this purpose, it is a common expedient to have a key opening 22 in the spindle. For convenience of use and to permit the use of commonly available nuts having radial openings or slots, the key opening 22 must pass through the rotational axis 12.

In order to provide lubrication to the lubricated area 16, a longitudinal lubricant passageway 24 is drilled in the spindle. Passageway 24 is paralleled to and spaced from rotational axis 12. One end 24A of longitudinal lubricant passageway 24 communicates with spindle end 14 and is provided with threads 26 to threadably receive a zert fitting (not shown) or other item by which lubricant can be injected into first lubricant passageway 24. Rather than using threads 26, a grease zert can be driven into the first lubricant passageway 24. The other end 24B of first lubricant passageway 24 terminates adjacent lubrication area 16.

A lateral lubricant passageway 28 communicates between longitudinal lubricant passageway 24 and lubricated area 16.

FIG. 2 is an end view showing nut 20 which, as illustrated in end view, is castellated nut having spaced apart slots 30 that can be aligned with key opening 22. When the nut is arranged with slots 30 in alignment with key opening 22, a key, such as a cotter pin 32, can be inserted through slot 30 and key opening 22 so as to rotationally lock the nut to the spindle. No communication exists between key opening 22 and longitudinal lubricant passageway 24 so no lubricant escapes from the longitudinal passageway out through the key opening. The spindle configuration of FIGS. 1 and 2 permit the use of a standard castellated nut since a key or pin, such as a cotter key, used to lock the nut to the spindle extends radially through the spindle, and therefore through the nut axis.

FIG. 3 shows a spindle 10, axis 12, outer end 14, lubricated area 16, threaded area 18, nut 20 and key opening 22. A longitudinal lubricant passageway 34 is drilled in the spindle coaxially with rotational axis 12. Key passageway 22 intersects longitudinal lubricant passageway 34. Since there is an intersection between key opening 22 and longitudinal lubricant passageway 34, lubricant inserted into passageway 34 will tend to escape through the key opening. Further, a key positioned in key opening 22 could block the flow of lubricant through the lubricant passageway 34. These two problems are overcome by first making the lubricant passageway 34 of larger diameter than key opening 22 at least in the area thereof where lubricant passageway 34 is intersected by key opening 22. Second, a pin 36 is employed having a circumferential external surface that snugly fits key opening 22. A pin 36 meeting this requirement may be such as a roll pin having a cross-sectional shape as shown in FIG. 5. Roll pins are commonly employed in industry. They have the characteristic that when driven or pressed into a key opening the circumferential diameter is compressed. This is due to the fact that in its normal unused state, a roll pin has a slight gap between its longitudinal edges so that when the edges are forced together the roll pin tends to constantly exert an outwardly expanding tension. Therefore, when roll pin 36 is driven into key opening 22 it resists extraction. Roll pin 36 is employed as a key in this application since its normal circumferential exterior surface, when in a compressed condition, closes key opening 22 to prevent lubricant from flowing out through the key opening when lubricant is being forced into lubricant passageway 34.

As seen in FIG. 4, when pin 36, in the preferred form as a roll pin, is driven into key opening 22, the pin extends between slots 30 in nut 20. Nut 20 is thus rotatably locked to the spindle and, at the same time, roll pin 36 is secured into position in a way to seal key opening 22 against the escape of lubricant.

Figure 7:
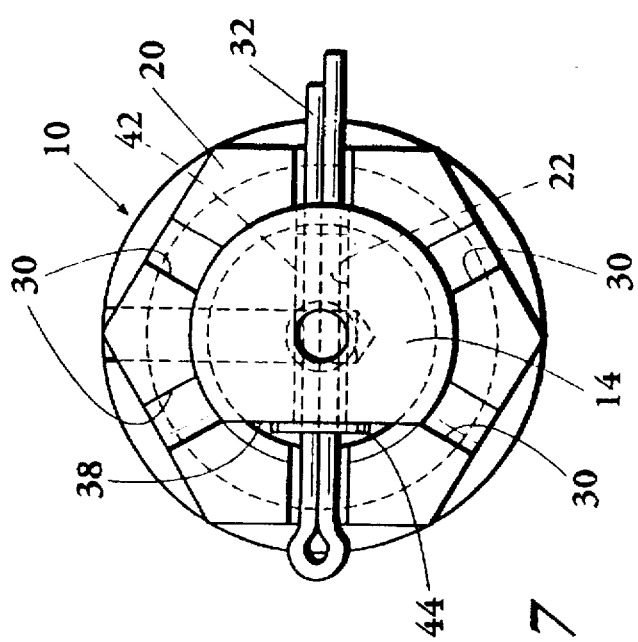
FIG. 7 is an elevational end view of the spindle of FIG. 6 showing a cotter pin that is received in a tubular nut retainer positioned in a key opening by which a nut is held in position on the spindle.
Figure 9:
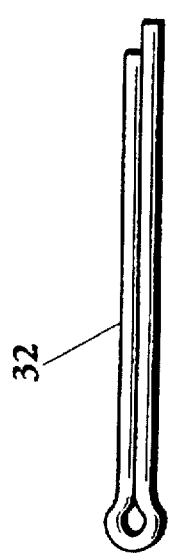
FIG. 9 is a elevational view of a cotter pin that can be employed in conjunction with the tubular rivet in the embodiment of FIGS. 6 and 7.

FIGS. 6 and 7 show another embodiment of the invention wherein spindle 10 has axis 12, an outer end 14, a threaded area 18, a nut 20 and a key opening 22. It is understood that the spindle 10 of FIG. 6 has a lubricated area and a lateral lubrication passageway as described with reference to FIGS. 1 and 3 that is not illustrated. In the embodiment of FIGS. 6 and 7, the longitudinal lubricant passageway 34 is coaxial with spindle longitudinal axis 12 and is of a diameter greater than the diameter of key opening 22 which intersects lubricant passageway 34, all as described with reference to FIGS. 3 and 4. However, in FIGS. 6 and 7, a flat surface 38, as seen in FIG. 7, is formed at the end 14 of spindle 10, the length of the flat surface being indicated by the dotted line 40 in FIG. 6. Flat surface 38 is in a plane parallel a plane of longitudinal axis 12.

Received within key opening 22 is a tubular rivet 42. Tubular rivet 42 has a head 44 that fits against spindle flat surface 38. The diameter of tubular rivet 42 is substantially that of key opening 22 so that the tubular rivet fits snugly within the key opening. In this way, when grease is inserted into lubricant passageway 34, the lubricant can flow around tubular rivet 42 but does not escape along key opening 22.

Figure 8:
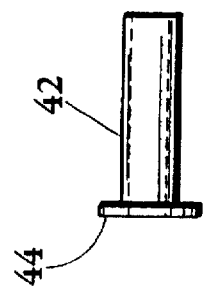
FIG. 8 is a cross-sectional view of a tubular rivet of the type that can be employed in the embodiment of FIGS. 6 and 7.

In order to retain nut 20 in position on threaded area 18 of spindle 10, cotter key 32 can be positioned in tubular rivet 42 to extend through slots 30 in nut 20. A cotter key like that of 32 is usually somewhat flat in cross-sectional configuration and would not seal key opening 22, however, by the use of tubular rivet 42, the key opening is sealed and a cotter key can then be employed in the usual way to rotatably lock nut 20 on threaded area 18 of the spindle. An alternate possibility is to use a tubular member, without a head, (not illustrated) of a length slightly less than the diameter of the threaded area 18 of the spindle. Such tubular member can be positioned in key opening 22 without requiring a flat surface 38 to function in the same way as the tubular rivet as shown in FIG. 8.

The prior art device illustrated in FIGS. 1 and 2 works satisfactorily and overcomes the problem of using an offset key opening such as shown in U.S. Pat. No. 5,120,170. However, the prior art device of FIGS. 1 and 2 has some limitations. If spindle 10 is of a fairly large diameter, the lateral lubricant passageway 24 can be spaced between key opening 22 and the spindle threaded external surface 18 and still allow sufficient room for a grease zert in the outer threaded openings 26 at the spindle outer end 14. However, with smaller size spindles there is insufficient room for a grease zert of the standard configuration since the outer edge of the grease zert will extend beyond the confines of the threaded circumferential area 18 of the spindle and interfere with installation or removal of nut 20. To overcome this limitation, alternate embodiments that provide for a coaxial longitudinal lubricant passageway and a coaxially positioned grease zert are illustrated and described.

FIGS. 10 and 11 show an alternate embodiment of the invention in which spindle 10 has a longitudinal lubricant passageway 34 that extends from spindle end 14 to radial lubricant passageway 28. Longitudinal lubricant passageway 34 is coaxial with the axis of spindle 10. A grease zert 46 is threadably positioned in threaded area 26 providing means for the injection of lubricant into lubricant passageway 34. Radial recesses 48 and 50 (see FIG. 11) are formed in the sidewalls of spindle 10 adjacent end 14. Radial recesses 48 and 50 are coaxial with each other, about an axis that is perpendicular to the spindle longitudinal axis. Positioned on the spindle is a nut 20 that has slots 30 therein. In order to retain nut 20 in a selected threaded position on spindle 10, a flexible C-shaped retainer 52 is employed. Retainer 52 is a unitary element bent of a single length of cylindrical metal to provide coaxial end portions 54 and 56. The end portions 54 and 56 are substantially straight and extend in alignment with each other with a space between the end portions. In FIG. 11 the C-shaped retainer is in its normal position wherein the end portions of 54 and 56 extend through opposed slots 30 in nut 20 and into recesses 48 and 50, threadably locking nut 20 is in position on the spindle. The C-shaped retainer 52 permits free access to grease zert 46. That is, the retainer does not interfere with lubricating the spindle. Recesses 48 and 50 are spaced from longitudinal lubricant passageway 34, that is, they do not communicate with it so that when lubricant is supplied through grease zert 46 into lubricant passageway 34, no lubricant is lost due to the retention ring.

FIGS. 12, 13, 16 and 17 show an alternate arrangement in which end 14 of spindle 10 has a coaxial recess 58 therein. The provision of coaxial recess 58 forms an integral tubular portion 60 at the outer end 14 of the spindle. Grease zert 46 is mounted in threaded opening 26 in communication with coaxial longitudinal lubricant passageway 34. Key opening 62 extends through the tubular portion 60 perpendicular to the spindle longitudinal axis. Grease zert 46 is inwardly positioned relative to key opening 62. Nut 20 can be retained in position on the spindle in the arrangement of FIG. 17 in two ways. First, a key, such as a cotter pin 32 as seen in FIG. 2, may be positioned through key opening 62. This will function to lock nut 20 in threadable position on the spindle, however, in order to lubricate the spindle the cotter key must be removed. If the spindle is such to require frequent lubrication, the removal of the cotter key to permit lubrication and subsequent replacement after lubrication may be an unacceptable problem. In such case, the second way of retaining nut 20 is by the use of a C-shaped retainer 52, employed in the same way as described with reference to FIG. 11. As shown in FIG. 16 the ends of the C-shaped retainer straight portions 54 and 56 are spaced apart so as to leave coaxial recess 58 unobstructed to thereby permit access to grease zert 46. FIG. 16 shows C-shaped retainer in solid outline in its normal position wherein the end portions extend coaxially with each other. In the flex position, as shown in dotted outline, the end portions are spread apart sufficient to permit the C-shaped retainer to be inserted through slots 30 in nut 20 and then into key opening 62 to retain the nut in position.

FIGS. 12 through 15 show further details of the arrangement of the embodiment of FIGS. 16 and 17. FIG. 15 illustrates the C-shaped retainer 52 in both its normal and its spread apart position illustrating the method whereby it can be inserted onto or removed from engagement with the slots in a nut and with key openings or key recesses in the spindle to retain the nut in position.

Each of the embodiments shown and described herein provide a new and unique way of lubricating a bearing area by employment of a lubricant passageway extending coincident with the rotational axis of a spindle while, at the same time, providing means for locking a nut on the spindle in a way that the locking arrangement will not permit the escape of lubricant.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A lubricated spindle and nut system with improved means of retaining the nut on the spindle, the spindle having an outer end and an area of external threads of selected diameter adjacent the outer end adaptable to receive the nut thereon, an internal lubrication passageway communicates with the spindle outer end, the passageway being adaptable to communicate with grease receiving means, the nut having openings or slots therein, the system comprising:

radial recesses formed in said spindle adjacent to and spaced from said end, the radial recesses being on opposed sides of the spindle within said area of external threads and wherein said spindle has a coaxial recess therein communicating with said spindle end, the internal diameter of said coaxial recess being less than the external diameter of said spindle providing an integral tubular portion of said spindle, said internal lubrication passageway concentrically communicating with said coaxial recess and wherein said grease receiving means is in the form of a grease zert received in said coaxial recess, said coaxial recess being of a depth such that said grease zert is fully positioned inwardly from said shaft end and inwardly of said radial recesses and wherein said radial recesses communicate with said coaxial recess; and a retainer of flexible metal, the retainer being of generally C-shaped configuration having opposed ends, with portions adjacent the ends that extend towards each other, the normal spacing between said ends being less than said spindle selected diameter, the retainer being deformable from a normal to a deformed condition to permit, when in the deformed condition, said portions adjacent the ends to extend through said opposed openings or slots in said nut and into said spindle radial recesses whereby said retainer, when in said normal condition, prevents rotation of said nut relative to said spindle.

* * * * *